United States Patent
Wang

(10) Patent No.: US 10,536,721 B2
(45) Date of Patent: Jan. 14, 2020

(54) RESTRICTED SCHEME DESIGN FOR VIDEO

(71) Applicant: QUALCOMM Incorporated, San Diego, CA (US)

(72) Inventor: Yekui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 15/862,046

(22) Filed: Jan. 4, 2018

(65) Prior Publication Data

US 2018/0199070 A1 Jul. 12, 2018

Related U.S. Application Data

(60) Provisional application No. 62/444,285, filed on Jan. 9, 2017.

(51) Int. Cl.

| H04N 19/61 | (2014.01) |
|---|---|
| H04N 19/159 | (2014.01) |
| H04N 19/70 | (2014.01) |
| H04N 19/96 | (2014.01) |
| H04N 19/186 | (2014.01) |
| H04N 19/124 | (2014.01) |

(Continued)

(52) U.S. Cl.
CPC ........... *H04N 19/70* (2014.11); *H04N 19/107* (2014.11); *H04N 19/124* (2014.11); *H04N 19/159* (2014.11); *H04N 19/186* (2014.11); *H04N 19/52* (2014.11); *H04N 19/593* (2014.11); *H04N 19/61* (2014.11); *H04N 19/96* (2014.11); *H04N 21/23614* (2013.01); *H04N 21/435* (2013.01); *H04N 21/4348* (2013.01); *H04N 21/85406* (2013.01)

(58) Field of Classification Search
CPC ........... H04N 21/85406; H04N 21/435; H04N 19/70; H04N 19/107; H04N 19/124; H04N 19/186; H04N 19/52; H04N 21/4348

See application file for complete search history.

(56) References Cited

U.S. PATENT DOCUMENTS

| 7,996,672 B1 * | 8/2011 | Agrawal | ............. | H04L 63/0428 380/201 |
|---|---|---|---|---|
| 8,347,087 B1 | 1/2013 | Agrawal et al. | | |
| 2012/0288208 A1 | 11/2012 | Katsumata et al. | | |

OTHER PUBLICATIONS

International Search Report and Written Opinion—PCT/US2018/012476—ISA/EPO—dated May 3, 2018.

(Continued)

*Primary Examiner* — Obafemi O Sosanya
(74) *Attorney, Agent, or Firm* — Polsinelli LLP

(57) ABSTRACT

Techniques and systems are provided for processing video data and processing one or more media format files. For example, video data can be obtained and processed to generate a media format file that includes the video data and a restricted scheme information box associated with the video data. The restricted scheme information box includes a plurality of scheme type boxes that identify a plurality of restricted scheme types required for processing the video data. In another example, the media format file including the video data and the restricted scheme information box associated with the video data is obtained. The media format file can be parsed, and the video data can be processed according to the plurality of restricted scheme types identified by the plurality of scheme type boxes.

46 Claims, 8 Drawing Sheets

(51) Int. Cl.
*H04N 19/593* (2014.01)
*H04N 19/107* (2014.01)
*H04N 19/52* (2014.01)
*H04N 21/435* (2011.01)
*H04N 21/854* (2011.01)
*H04N 21/236* (2011.01)
*H04N 21/434* (2011.01)

(56) References Cited

OTHER PUBLICATIONS

"Text of ISO/IEC 14496-12:2015/COR 1 and ISO/IEC 15444-12:2015/COR 1", 115.MPEG Meeting; May 30, 2016-Mar. 3, 2016; Geneva; (Motion Picture Expert Group or ISO/IEC JTC1/SC29/WG11), No. N16163, Jun. 23, 2016 (Jun. 23, 2016), XP030022836, 235 pages.
Wang Y-K (QUALCOMM): "Enhanced Support of Restricted Schemes in ISOBMFF", 117.MPEG Meeting; Jan. 16, 2017-Jan. 20, 2017; Geneva; (Motion Picture Expert Group or ISO/IEC JTC1/SC29/WG11), No. m39985, Jan. 11, 2017 (Jan. 11, 2017), XP030068330, 5 pages.

* cited by examiner

600

OBTAIN A MEDIA FORMAT FILE INCLUDING VIDEO DATA AND A RESTRICTED SCHEME INFORMATION BOX ASSOCIATED WITH THE VIDEO DATA, THE RESTRICTED SCHEME INFORMATION BOX INCLUDING A PLURALITY OF SCHEME TYPE BOXES, WHEREIN THE PLURALITY OF SCHEME TYPE BOXES IDENTIFY A PLURALITY OF RESTRICTED SCHEME TYPES REQUIRED FOR PROCESSING THE VIDEO DATA
602

PARSE THE MEDIA FORMAT FILE
604

PROCESS THE VIDEO DATA ACCORDING TO THE PLURALITY OF RESTRICTED SCHEME TYPES IDENTIFIED BY THE PLURALITY OF SCHEME TYPE BOXES
606

FIG. 6

RESTRICTED SCHEME DESIGN FOR VIDEO

CROSS-REFERENCE TO RELATED APPLICATIONS

This application claims the benefit of U.S. Provisional Application No. 62/444,285, filed Jan. 9, 2017, which is hereby incorporated by reference, in its entirety and for all purposes.

FIELD

This application is related to restricted schemes for video. More specifically, this application relates to systems and methods for providing an improved design of the restricted scheme for a media file format.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bitrate, while avoiding or minimizing degradations to video quality. With ever-evolving video services becoming available, encoding techniques with better coding efficiency are needed.

BRIEF SUMMARY

In some examples, techniques and systems are described herein for providing an improved design of the restricted scheme for a media file format. The media file format can include the ISO base media file format (ISOBMFF) or other suitable media file format. ISOBMFF is one example of a media file format, which includes a restricted scheme design. The restricted scheme design in ISOBMFF is used for handling situations where the author of the media format file requires certain actions to be performed by the player or renderer when processing media content (e.g., a video bitstream) associated with the media format file. The restricted scheme enables players to inspect the media format file to easily determine such requirements for rendering the media content, and can prevent legacy players from downloading, decoding, and rendering files that require further processing. A legacy player can include a player device that is not designed to process certain media content because, for example, the player is only able to play video content coded without the required processing. Illustrative examples of types of restricted schemes include a restricted scheme for stereoscopic video frame packing arrangements, a restricted scheme for virtual reality video, among others.

Various restrictions are placed on the restricted scheme of the ISOBMFF. For example, the number of restricted schemes that can be included in a portion of a media format file that is applicable to certain media content (e.g., media content associated with a sample entry of the media format file) is limited to only one restricted scheme. Such restrictions disallow multiple types of restricted schemes to be simultaneously applied to the same media content associated with one sample entry. A sample entry can be associated with one or more samples of a video file. For example, each media stream can be contained in a track (of the media format file) that is specialized for the media type of the media stream (e.g., video, audio, or other media type). The media stream can be parameterized by a sample entry, which contains the name of the media type (indicating the type of decoder needed to decode the media stream) and any parameterization of the decoder that is needed. In one illustrative example, the restrictions on the restricted scheme in ISOBMFF prevent the possibility to apply both the restricted scheme for stereoscopic video arrangements and the restricted scheme for virtual reality video to the same video content associated with one sample entry. However, video content to which multiple restricted schemes is applied, such as a frame-packed stereoscopic virtual reality video, are possible and very likely in real-world media applications.

The techniques and systems described herein can generate and process a media format file (according to the media file format) that includes multiple restricted schemes that can be simultaneously applied to the same media content associated with one sample entry. The terms restricted scheme and restriction scheme can be used interchangeably. The improved design applies to any type of video codec. In some examples, multiple scheme type boxes can be included in a restricted scheme information box contained in a sample entry of a media format file. A scheme type box defines the exact nature of a particular restriction. The multiple scheme type boxes allow the ability to identify a plurality of restricted schemes required for processing the media content associated with the sample entry. A scheme type box can also be referred to as a compatible scheme type box. In some cases, multiple scheme information boxes can also be included in the restricted scheme information box. The data needed for a particular scheme is stored in the scheme information box. For example, one scheme information box can be included in the restricted scheme information box for each scheme type box. In some examples, multiple restricted scheme information boxes can be included in a sample entry container.

According to at least one example, a method of processing video data is provided. The method comprises obtaining the video data. The method further comprises generating a media format file including the video data and a restricted scheme information box associated with the video data. The restricted scheme information box includes a plurality of scheme type boxes. The plurality of scheme type boxes identify a plurality of restricted scheme types required for processing the video data.

In another example, an apparatus for processing video data is provided that includes a memory configured to store the video data and a processor. The processor is configured to and can obtain the video data. The processor is further configured to and can generate a media format file including the video data and a restricted scheme information box associated with the video data. The restricted scheme information box includes a plurality of scheme type boxes. The plurality of scheme type boxes identify a plurality of restricted scheme types required for processing the video data.

In another example, a non-transitory computer-readable medium is provided having stored thereon instructions that, when executed by one or more processors, cause the one or more processor to: obtain the video data; and generate a media format file including the video data and a restricted scheme information box associated with the video data, the restricted scheme information box including a plurality of scheme type boxes, wherein the plurality of scheme type boxes identify a plurality of restricted scheme types required for processing the video data.

In another example, an apparatus for processing video data is provided. The apparatus includes means for obtaining the video data. The apparatus further includes means for generating a media format file including the video data and a restricted scheme information box associated with the video data. The restricted scheme information box includes a plurality of scheme type boxes. The plurality of scheme type boxes identify a plurality of restricted scheme types required for processing the video data.

In some aspects, each scheme type box of the plurality of scheme type boxes identifies a different restricted scheme type required for processing the video data.

In some aspects, the video data is associated with one sample entry of the media format file.

In some aspects, a scheme type box of the plurality of scheme type boxes identifies a version of a restricted scheme type identified by the scheme type box.

In some aspects, a scheme type box of the plurality of scheme type boxes includes an identifier identifying a source for data needed to implement a restricted scheme type identified by the scheme type box.

In some aspects, the restricted scheme information box further includes a plurality of scheme information boxes. A scheme information box of the plurality of scheme information boxes includes data needed for a restricted scheme type identified by a scheme type box of the plurality of scheme type boxes.

In some aspects, the media format file is generated using an ISO base media file format (ISOBMFF) or using a media file format derived from the ISO base media file format.

In some aspects, the method, apparatuses, and computer-readable medium described above may further comprise transmitting the media format file.

In some aspects, the method, apparatuses, and computer-readable medium described above may further comprise storing the media format file.

In some aspects, the apparatus comprises a mobile device with a camera for capturing pictures.

According to at least one other example, a method of processing one or more media format files is provided. The method comprises obtaining a media format file including video data and a restricted scheme information box associated with the video data. The restricted scheme information box includes a plurality of scheme type boxes. The plurality of scheme type boxes identify a plurality of restricted scheme types required for processing the video data. The method further comprises parsing the media format file, and processing the video data according to the plurality of restricted scheme types identified by the plurality of scheme type boxes.

In another example, an apparatus for processing one or more media format files is provided that includes a memory configured to store the video data and a processor. The processor is configured to and can obtain a media format file including video data and a restricted scheme information box associated with the video data. The restricted scheme information box includes a plurality of scheme type boxes. The plurality of scheme type boxes identify a plurality of restricted scheme types required for processing the video data. The processor is further configured to and can parse the media format file, and process the video data according to the plurality of restricted scheme types identified by the plurality of scheme type boxes.

In another example, a non-transitory computer-readable medium is provided having stored thereon instructions that, when executed by one or more processors, cause the one or more processor to: obtaining a media format file including video data and a restricted scheme information box associated with the video data, the restricted scheme information box including a plurality of scheme type boxes, wherein the plurality of scheme type boxes identify a plurality of restricted scheme types required for processing the video data; parsing the media format file; and processing the video data according to the plurality of restricted scheme types identified by the plurality of scheme type boxes.

In another example, an apparatus for processing one or more media format files is provided. The apparatus includes means for obtaining a media format file including video data and a restricted scheme information box associated with the video data. The restricted scheme information box includes a plurality of scheme type boxes. The plurality of scheme type boxes identify a plurality of restricted scheme types required for processing the video data. The apparatus further includes means for parsing the media format file, and means for processing the video data according to the plurality of restricted scheme types identified by the plurality of scheme type boxes.

In some aspects, each scheme type box of the plurality of scheme type boxes identifies a different restricted scheme type required for processing the video data.

In some aspects, the video data is associated with one sample entry of the media format file.

In some aspects, a scheme type box of the plurality of scheme type boxes identifies a version of a restricted scheme type identified by the scheme type box.

In some aspects, a scheme type box of the plurality of scheme type boxes includes an identifier identifying a source for data needed to implement a restricted scheme type identified by the scheme type box.

In some aspects, the restricted scheme information box further includes a plurality of scheme information boxes. A scheme information box of the plurality of scheme information boxes includes data needed for a restricted scheme type identified by a scheme type box of the plurality of scheme type boxes.

In some aspects, the media format file is generated using an ISO base media file format (ISOBMFF) or using a media file format derived from the ISO base media file format.

In some aspects, the method, apparatuses, and computer-readable medium described above may further comprise decoding the video data. For example, the apparatus can include a decoder for decoding the video data.

In some aspects, the method, apparatuses, and computer-readable medium described above may further comprise displaying the decoded video data. For example, the apparatus can include a display for displaying the decoded video data.

In some aspects, the apparatus comprises a mobile device with a camera for capturing pictures.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 6 is a flowchart illustrating an example of a process for processing one or more media format files, in accordance with some examples;

DETAILED DESCRIPTION

Figure 1:
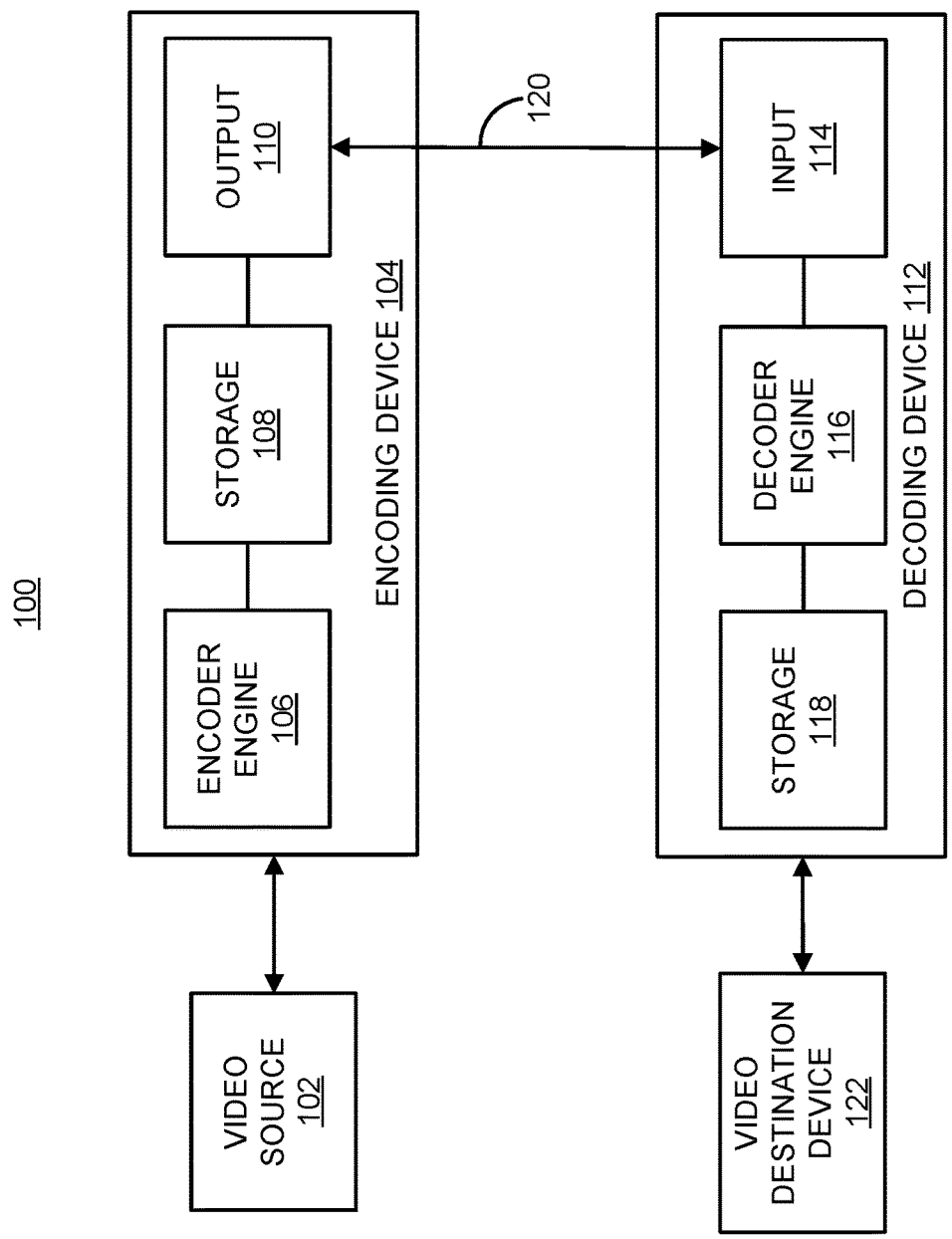
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Video content can be captured and coded into an encoded video bitstream. Media formats can be used for encapsulating coded video. One example of a media format includes the ISO base media file format (ISOBMFF). The ISOBMFF is used as the basis for many codec encapsulation formats. Continuous media (e.g., audio and video), static media (e.g., images), as well as metadata can be stored in a file conforming to the ISOBMFF. Files structured according to the ISOBMFF may be used for many purposes, including local media file playback, progressive downloading of a remote file, segments for Dynamic Adaptive Streaming over HTTP (DASH), containers for content to be streamed and packetization instructions for the content, recording of received real-time media streams, among others.

The ISOBMFF includes a restricted scheme design that is used when a creator (e.g., an author, producer, or the like) of the media format file requires certain actions to be performed by the player or renderer when processing media content (e.g., an encoded video bitstream) associated with the media format file. As described in more detail below, one or more systems and methods described herein are directed to improving the restricted scheme design. Such improvements can be used for ISOBMFF-based files, or for any other file format.

As noted above, captured video frames can be encoded and/or compressed for storage and/or transmission, and a receiver device can decode and/or decompress the encoded video frames. As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a video coding system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions has been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). MPEG and ITU-T VCEG have also formed a joint exploration video team (JVET) to explore new coding tools for the next generation of video coding standard. The reference software is called JEM (joint exploration model).

Many embodiments described herein provide examples using the JEM model, the HEVC standard, and/or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. Each picture or frame of a video is a still image of a scene. In some examples, a picture or frame of the video data can include 360-degree video data mapped or projected onto planes of a geometry (e.g., a TSP, a cube, or other suitable geometry). The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bitrate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 7. An example of specific details of the decoding device 112 is described below with reference to FIG. 8.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, media formats can be used for encapsulating coded video. One example of a media format includes the ISO base media file format (ISOBMFF, specified in ISO/IEC 14496-12). There are also other media file formats derived from the ISOBMFF (ISO/IEC 14496-12), including MPEG-4 file format (ISO/IEC 14496-14), 3GPP file format (3GPP TS 26.244) and AVC file format (ISO/IEC 14496-15). For example, a video bitstream encoded as discussed above can be written or packed into one or more files using the ISOBMFF, a file format derived from the ISOBMFF, some other file format, and/or a combination of file formats including the ISOBMFF. The ISOBMFF file or files can be played back using a video player device, can be transmitted by an encoding device (or file generation device)

and then displayed by a player device, can be stored, and/or can be used in any other suitable manner.

The ISOBMFF is used as the basis for many codec encapsulation formats (e.g., the AVC file format, among others), as well as for many multimedia container formats (e.g., the MPEG-4 file format, the 3GPP file format (3GP), the DVB file format, among others). Continuous media (e.g., audio and video), static media (e.g., images), as well as metadata can be stored in a file conforming to the ISOBMFF. Files structured according to the ISOBMFF may be used for many purposes, including local media file playback, progressive downloading of a remote file, segments for Dynamic Adaptive Streaming over HTTP (DASH), containers for content to be streamed and packetization instructions for the content, recording of received real-time media streams, among other suitable purposes. For example, although originally designed for storage, the ISOBMFF has proven to be very valuable for media streaming (e.g. for progressive download or DASH). For streaming purposes, movie fragments defined in ISOBMFF can be used.

The ISOBMFF is designed to contain timed media information in a flexible and extensible format that facilitates interchange, management, editing, and presentation of the media. Presentation of the media may be "local" to the system containing the presentation or the presentation may be via a network or other stream delivery mechanism (e.g., DASH or other suitable streaming mechanism). A "presentation," as defined by the ISOBMFF specification, is a sequence of pictures, often related by having been captured sequentially by a video capture device, or related for some other reason. Herein, a presentation may also be referred to as a movie or a video presentation. A presentation may include audio. A single presentation may be contained in one or more files, with one file containing the metadata for the whole presentation. The metadata includes information such as timing and framing data, descriptors, pointers, parameters, and other information that describes the presentation. Metadata does not include the video and/or audio data itself. Files other than the file that contains the metadata need not be formatted according to the ISOBMFF, and need only be formatted such that these files can be referenced by the metadata.

The file structure of an ISO base media file is object-oriented, and the structure of an individual object in the file can be inferred directly from the object's type. The objects in an ISO base media file are referred to as "boxes" by the ISOBMFF specification. An ISO base media file is structured as a sequence of boxes, which can contain other boxes. A box is the elementary syntax structure in the ISOBMFF, including a four-character coded box type, the byte count of the box, and the payload. Boxes can include a header that provides a size and a type for the box. The size describes the entire size of the box, including the header, fields, and all boxes contained within the box. Boxes with a type that is not recognized by a player device are typically ignored and skipped.

An ISOBMFF file can contain different kinds of boxes. For example, a Movie box ("moov") contains the metadata for the continuous media streams present in the file, with each media stream being represented in the file as a track. The metadata for a track is enclosed in a Track box ("trak"), while the media content of a track is either enclosed in a Media Data box ("mdat") or directly in a separate file. There can be different kinds of trackers. The ISOBMFF specifies, for example, the following types of tracks: a media track, which contains an elementary media stream; a hint track, which either includes media transmission instructions or represents a received packet stream; and a timed metadata track, which comprises time-synchronized metadata.

The media content for tracks include a sequence of samples, such as audio or video access units. The metadata for each track includes a list of sample description entries, each providing the coding or encapsulation format used in the track and the initialization data needed for processing that format. Each sample is associated with one of the sample description entries of the track.

The ISOBMFF enables the use of sample-specific metadata using various mechanisms. Specific boxes within a Sample Table box ("stbl") have been standardized to respond to common needs. For example, a Sync Sample box ("stss") can be used to list the random access samples of the track. The sample grouping mechanism enables mapping of samples, according to a four-character grouping type, into groups of samples sharing the same property, specified as a sample group description entry in the file. Several grouping types have been specified in the ISOBMFF.

Figure 2:
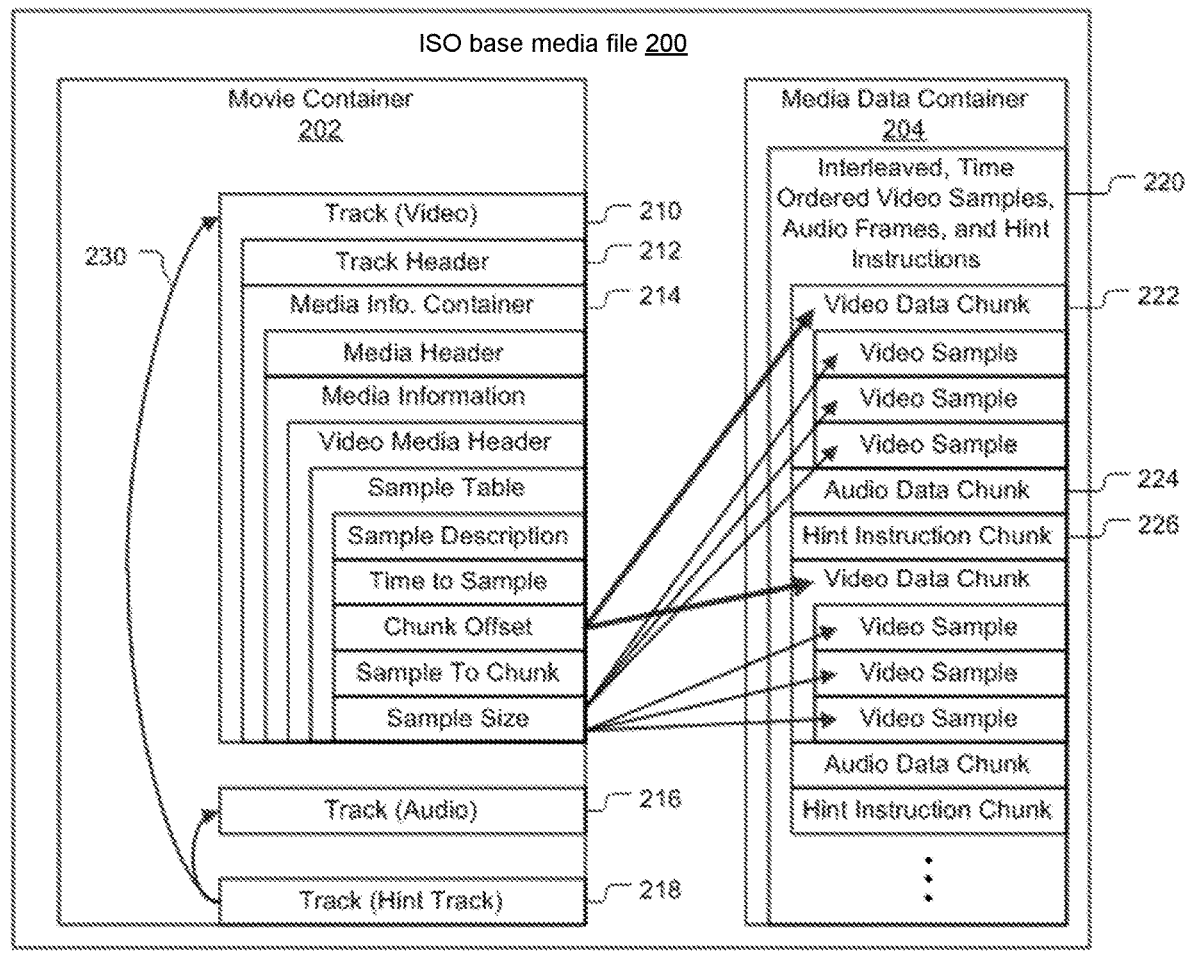
FIG. 2 is a diagram illustrating an example file structure following the ISO base media file format (ISOBMFF), in accordance with some examples.

FIG. 2 is a diagram illustrating an example of a file 200 with a file structure following the ISO base media file format. The ISO base media file 200 can also be referred to as a media format file. A media presentation can be, but is not always, contained in one file, in which case the media presentation is self-contained in the file. The file 200 includes a movie container 202 (or "movie box"). The movie container 202 may contain the metadata of the media, which can include, for example, one or more video tracks and one or more audio tracks. For example, a video track 210 may contain information about various layers of a video, which may be stored in one or more media information containers 214. For instance, a media information container 214 may include a sample table, which provides information about the video samples for the video. In various implementations, the video data chunk 222 and the audio data chunk 224 are contained in the media data container 204. In some implementations, the video data chunk 222 and the audio data 224 can be contained in one or more other files (other than file 200).

In various implementations, a presentation (e.g., a motion sequence) may be contained in several files. All timing and framing (e.g., position and size) information can be in the ISO base media file and the ancillary files may essentially use any format.

The ISO files have a logical structure, a time structure, and a physical structure. The different structures are not required to be coupled. The logical structure of the file is of a movie that in turn contains a set of time-parallel tracks (e.g., video track 210). The time structure of the file is that the tracks contain sequences of samples in time, and those sequences are mapped into the timeline of the overall movie by optional edit lists.

The physical structure of the file separates the data needed for logical, time, and structural de-composition, from the media data samples themselves. This structural information is concentrated in a movie box (e.g., movie container 202), possibly extended in time by movie fragment boxes. The movie box documents the logical and timing relationships of the samples, and also contains pointers to where the samples are located. Pointers may point into the same file or another file, which can be referenced by, for example, a Uniform Resource Locator (URL) or the like.

Each media stream is contained in a track specialized for that media type. For example, in the example illustrated in FIG. 2, the movie container 202 includes a video track 210 and an audio track 216. The movie container 202 may also include a hint track 218, which may include transmission instructions from the video track 210 and/or audio track 216, or may represent other information about other tracks in the movie container 202 or other movie container (not shown) of the file 200. Each track may be further parameterized by a sample entry. For example, in the illustrated example, the video track 210 includes a media information container 214, which includes a table of sample (referred to as a "sample table"). A sample entry contains the "name" of the exact media type (e.g., the type of the decoder needed to decode the stream) and any parameterization of that decoder needed. The name may take the form of a four-character code (e.g., moov, trak, or other suitable name code). There are defined sample entry formats for various media types. The sample entries may further include pointers to video data chunks (e.g., video data chunk 222) in a box 220 in the media data container 204. The box 220 includes interleaved, time ordered video samples (organized into video data chunks, such as video data chunk 222), audio frames (e.g., in audio data chunk 224), and hint instructions (e.g., in hint instruction chunk 226).

Support for metadata can take different forms. In one example, timed metadata may be stored in an appropriate track, and can be synchronized as desired with the media data described by the metadata. In a second example, there is general support for non-timed metadata attached to the movie or to an individual track. The structural support is general, and allows, as in the media data, the storage of metadata resources elsewhere in the file or in another file.

In some cases, one track in a video file can contain multiple layers. The video track may also include a track header (e.g., track header 212), which may contain some information about the contents of the video track (e.g., video track 210). For example, the track header may include a track content information (also referred to as 'tcon') box. The tcon box may list all of the layers and sub-layers in the video track. A video file may also include an operating point information box (also referred to as an 'oinf' box). The oinf box records information about operating points, such as the layers and sub-layers that constitute the operating point, dependencies (if any) between the operating points, the profile, level, and tier parameter of the operating point, and other such operating point relevant information. In some cases, an operating point can also be referred to as an operation point.

Figure 3:
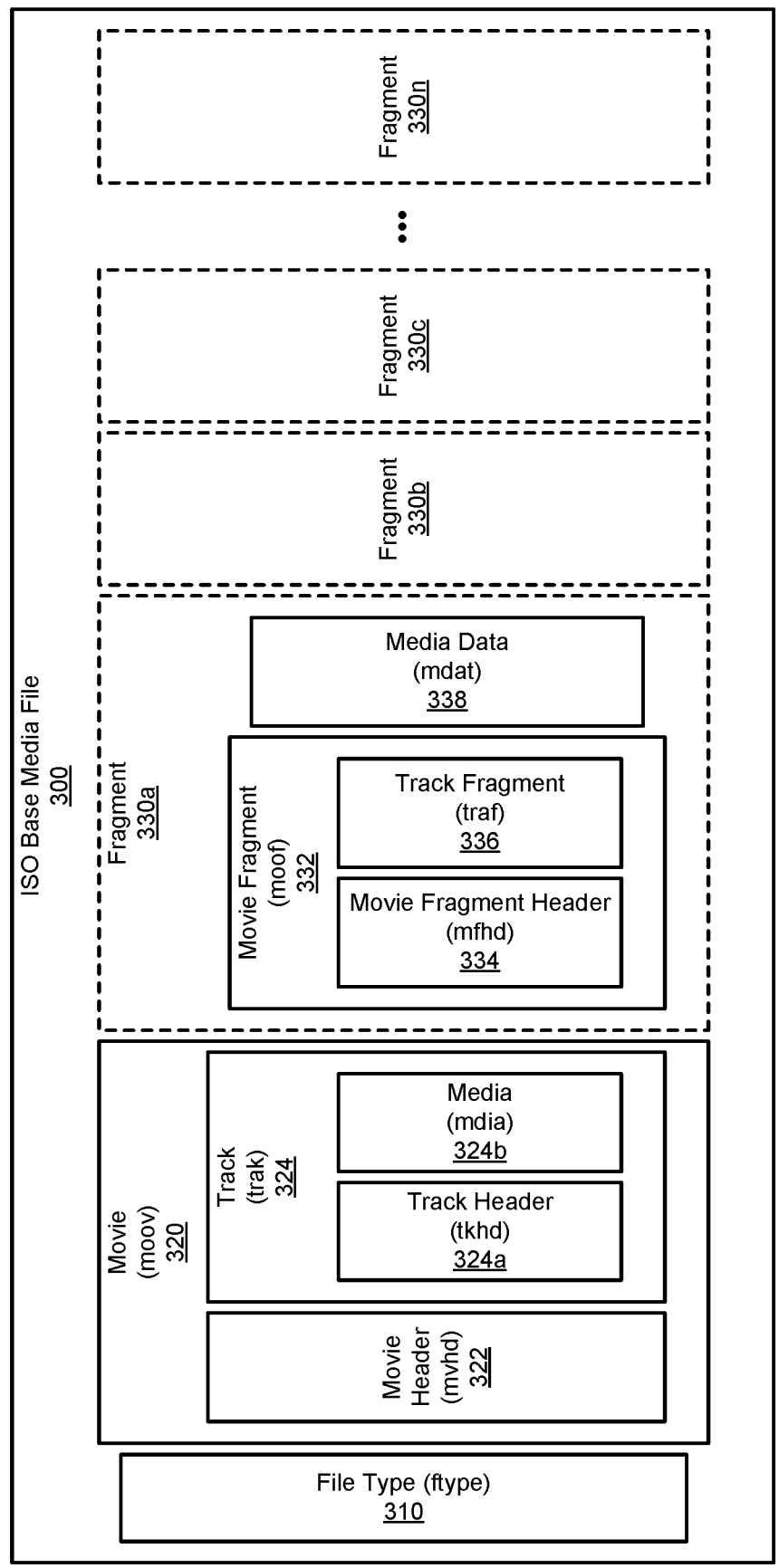
FIG. 3 is a diagram illustrating an example an ISO base media file (formatted according to the ISOBMFF) that contains data and metadata for a video presentation, in accordance with some examples.

FIG. 3 is a diagram illustrating another example of an ISO base media file 300 formatted according to the ISOBMFF. The ISO base media file 300 can also be referred to as a media format file. The ISO base media file 300 contains data and metadata for a video presentation. At the top level of the file 300, there is included a file type box 310, a movie box 320, and one or more fragments 330a, 330b, 330c, through 330n. Other boxes that can be included at this level but that are not represented in this example include free space boxes, metadata boxes, and media data boxes, among others.

The file type box 310 is identified by the box type "ftyp." The file type box 310 is typically placed as early as possible in the ISO base media file 300. The file type box 310 identifies an ISOBMFF specification that is the most suitable for parsing the file. "Most" in this instance means that the ISO base media file 300 may have been formatted according to a particular ISOBMFF specification, but is likely compatible with other iterations of the specification. This most suitable specification is referred to as the major brand. A player device can use the major brand to determine whether the device is capable of decoding and displaying the contents of the file. The file type box 310 can also include a version number, which can be used to indicate a version of the ISOBMFF specification. The file type box 310 can also include a list of compatible brands, which includes a list of others brands with which the file is compatible. An ISO base media file can be compatible with more than one major brand.

When an ISO base media file includes a file type box (like the ISO base media file 300), there is only one file type box. In some cases, an ISO base media file may omit the file type box in order to be compatible with older player devices. When an ISO base media file does not include a file type box, a player device can assume a default major brand (e.g. mp41), a minor version (e.g., "0"), and a compatible brand (e.g., mp41, isom, iso2, avc1, or the like).

The ISO base media file 300 further includes a movie box 320, which contains the metadata for the presentation. The movie box 320 is identified by the box type "moov." ISO/IEC 14496-12 provides that a presentation, whether contained in one file or multiple files, can include only one movie box 320. Frequently, the movie box is near the beginning of an ISO base media file (e.g., as indicated by the placement of the movie box 320 in the ISO base media file 300). The movie box 320 includes a movie header box 322, and can include one or more track boxes 324 as well as other boxes.

The movie header box 322, identified by the box type "mvhd," can include information that is media-independent and relevant to the presentation as a whole. For example, the movie header box 322 can include information such as a creation time, a modification time, a timescale, and/or a duration for the presentation, among other things. The movie header box 322 can also include an identifier that identifies the next track in the presentation. For example, the identifier can point to the track box 324 contained by the movie box 320 in the illustrated example.

The track box 324, identified by the box type "trak," can contain the information for a track for a presentation. A presentation can include one or more tracks, where each track is independent of other tracks in the presentation. Each track can include the temporal and spatial information that is specific to the content in the track, and each track can be associated with a media box. The data in a track can be media data, in which case the track is a media track, or the data can be packetization information for streaming protocols, in which case the track is a hint track. Media data includes, for example, video and audio data. In the example shown in FIG. 3, the example track box 324 includes a track header box 324a and a media box 324b. A track box can include other boxes, such as a track reference box, a track group box, an edit box, a user data box, a meta box, among others.

The track header box 324a, identified by the box type "tkhd," can specify the characteristics of a track contained in the track box 324. For example, the track header box 324a can include a creation time, modification time, duration, track identifier, layer identifier, group identifier, volume, width, and/or height of the track, among other things. For a media track, the track header box 324a can further identify whether the track is enabled, whether the track should be played as part of the presentation, whether the track can be used to preview the presentation, among other uses of the track. Presentation of a track is generally assumed to be at the beginning of a presentation. The track box 324 can include an edit list box (not shown) that can include an explicit timeline map. The timeline map can specify, among other things, an offset time for the track, where the offset indicates a start time, after the beginning of the presentation, for the track.

In the illustrated example, the track box 324 also includes a media box 324b, identified by the box type "mdia." The media box 324b can contain the objects and information about the media data in the track. For example, the media box 324b can contain a handler reference box, which can identify the media type of the track and the process by which the media in the track is presented. As another example, the media box 324b can contain a media information box, which can specify the characteristics of the media in the track. The media information box can further include a table of samples, as described above with respect to FIG. 2, where each sample describes a chunk of media data (e.g., video or audio data) including, for example, the location of the data for the sample. The data for a sample is stored in a media data box, discussed further below. As with most other boxes, the media box 324b can also include a media header box.

In the illustrated example, the example ISO base media file 300 also includes multiple fragments 330a, 330b, 330c, through 330n of the presentation. The fragments 330a, 330b, 330c, through 330n are not ISOBMFF boxes, but rather describe a movie fragment box 332 and a media data box 338 that is referenced by the movie fragment box 332. The movie fragment box 332 and media data box 338 are top-level boxes, but are grouped here to indicate the relationship between a movie fragment box 332 and a media data box 338.

A movie fragment box 332, identified by the box type "moof," can extend a presentation by including additional information that would otherwise be stored in the movie box 320. Using movie fragment boxes (e.g., movie fragment box 332), a presentation can be built incrementally. A movie fragment box 332 can include a movie fragment header box 334 and a track fragment box 336, as well as other boxes not illustrated here.

The movie fragment header box 334, identified by the box type "mfhd," can include a sequence number. A player device can use the sequence number to verify that the fragment 330a includes the next piece of data for the presentation. In some cases, the contents of a file, or the files for a presentation, can be provided to a player device out of order. For example, network packets can frequently arrive in an order other than in the order that the packets were originally transmitted. In these cases, the sequence number can assist a player device in determining the correct order for fragments.

The movie fragment box 332 can also include one or more track fragment boxes 336, identified by the box type "traf". A movie fragment box 332 can include a set of track fragments, zero or more per track. The track fragments can contain zero or more track runs, each of which describes a contiguous run of samples for a track. Track fragments can be used to add empty time to a track, in addition to adding samples to the track.

The media data box 338, identified by the box type "mdat," contains media data. In video tracks, the media data box 338 can contain video frames, access units, NAL units, or other form of video data. A media data box can alternatively or additionally include audio data. A presentation can include zero or more media data boxes, contained in one or more individual files. The media data is described by metadata. In the illustrated example, the media data in the media data box 338 can be described by metadata included in the track fragment box 336. In other examples, the media data in a media data box can be described by metadata in the movie box 320. The metadata can refer to a particular media data by an absolute offset within the file 300, such that a media data header and/or free space within the media data box 338 can be skipped.

Other fragments 330b, 330c, through 330n in the ISO base media file 300 can contain boxes similar to those illustrated for the first fragment 330a, and/or can contain other boxes.

As noted above, the ISOBMFF includes support for streaming media data over a network, in addition to supporting local playback of the media. The file or files that include one movie presentation can include additional tracks, called hint tracks, which contain instructions that can assist a streaming server in forming and transmitting the file or files as packets. These instructions can include, for example, data for the server to send (e.g., header information) or references to segments of the media data. A file can include separate hint tracks for different streaming protocols. Hint tracks can also be added to a file without needing to reformat the file.

One method for streaming media data is Dynamic Adaptive Streaming over HyperText Transfer Protocol (HTTP), or DASH (defined in ISO/IEC 23009-1:2014). DASH, which is also known as MPEG-DASH, is an adaptive bitrate streaming technique that enables high quality streaming of media content using conventional HTTP web servers. DASH operates by breaking the media content into a sequence of small HTTP-based file segments, where each segment contains a short time interval of the content. Using DASH, a server can provide the media content at different bit rates. A client device that is playing the media can select among the alternative bit rates when downloading a next segment, and thus adapt to changing network conditions. DASH uses the HTTP web server infrastructure of the Internet to deliver content over the World Wide Web. DASH is independent of the codec used to encode and decode the media content, and thus operates with codecs such as H.264 and HEVC, among others.

The ISOBMFF includes a restricted scheme design that is used when a creator (e.g., an author, producer, or the like) of the media format file requires certain actions to be performed by the player or renderer when processing media content associated with the ISO base media file. The restricted scheme enables players to inspect the media format file to easily determine such requirements for rendering the media content, and can prevent legacy players from downloading, decoding, and rendering files that require further processing. A legacy player can include a player device that is not designed to process certain media content because, for example, the player is only able to play video content coded without the required processing. The restricted scheme may be applied when the content should only be decoded by players that present it correctly. Illustrative examples of types of restricted schemes include a restricted scheme type for stereoscopic video frame packing arrangements (denoted as 'stvi'), a restricted scheme type for virtual reality video (denoted as 'vrvd'), a restricted scheme type for projected omnidirectional video (denoted as 'podv'), a restricted scheme type for equirectangular projected video (denoted as 'erpv'), a restricted scheme type for packed equirectangular or cubemap projected video (denoted as 'ercm'), a restricted scheme type for fisheye omnidirectional video (denoted as 'fodv'), among others.

Aspects of the restricted scheme mechanism is similar to the content protection transformation, where sample entries are hidden behind generic sample entries, 'encv', 'enca', and the like, indicating encrypted or encapsulated media. The analogous mechanism for restricted video uses a transformation with the generic sample entry 'resv'.

An example of application of the restricted scheme is applied as follows:
1) The four-character-code of the sample entry is replaced by a new sample entry code 'resv' (meaning restricted video).
2) A Restricted Scheme Info box is added to the sample description, leaving all other boxes unmodified.
3) The original sample entry type is stored within an Original Format box contained in the Restricted Scheme Info box.

A restricted scheme information box (denoted as RestrictedSchemeInfoBox) is formatted in the same way as a protection scheme information box (denoted as ProtectionSchemeInfoBox, except that the restricted scheme information box uses the identifier 'rinf' instead of 'sinf' (as shown in below examples). The original sample entry type is contained in the Original Format box located in the restricted scheme information box (in the same way the Protection Scheme Info box is for encrypted media).

The exact nature of the restriction is defined in a scheme top box (denoted as SchemeTypeBox) contained in the restricted scheme information box, and the data needed for that scheme is stored in a scheme information box (denoted as SchemeInformationBox).

The restriction and protection schemes can be applied at the same time. The order of the transformations follows from the four-character code of the sample entry. For instance, if the sample entry type is 'resv', undoing the restricted scheme transformation may result in a sample entry type 'encu', indicating that the media is protected. Undoing a transformation (e.g., a protection scheme, a protection scheme, or the like) can be done using a parsing process by parsing the file structure of the ISO base media file to unwrap the file layer by layer to obtain and process the information in the file. For example, after parsing the restricted scheme transformation for the restricted video sample entry type 'resv' to obtain information related to a particular scheme type used for the sample entry type 'resv' (e.g., a restricted scheme type for stereoscopic video arrangements, a restricted scheme type for virtual reality video, or other scheme type), the player device will find information in the file related to the sample entry type 'encu.' The player device can then parse the encryption related content to obtain the information needed to decrypt the content. Even further, after parsing and processing the encryption information, the player device may find coding information needed for decoding the content. The different content read from the file can then be processed. For example, the video content can be decrypted using the encryption related information from the file. The decrypted video can be decoded using the coding related information in the file, and the decoded video can then be rendered using the restricted scheme information (e.g., de-packing a frame using 'stvi' frame type information for stereoscopic video arrangements) along with other information in the file.

Note that if the file author only wants to provide advisory information without stopping legacy players from playing the file, the Restricted Scheme Info box may be placed inside the sample entry without applying the four-character-code transformation. In this case, it is not necessary to include an Original Format box.

The Restricted Scheme Information Box is currently defined as follows:
Restricted Scheme Information Box
Box Types: 'rinf'
Container: Restricted Sample Entry or Sample Entry
Mandatory: Yes
Quantity: Exactly one
The Restricted Scheme Information Box contains all the information required both to understand the restricted scheme applied and its parameters. It also documents the original (un-transformed) sample entry type of the media. The Restricted Scheme Information Box is a container Box. It is mandatory in a sample entry that uses a code indicating a restricted stream, i.e., 'resv'.
When used in a restricted sample entry, this box must contain the original format box to document the original sample entry type and a Scheme type box. A Scheme Information box may be required depending on the restriction scheme.

```
aligned(8) class RestrictedSchemeInfoBox(fmt) extends Box('rinf') {
    OriginalFormatBox(fmt)      original_format;
    SchemeTypeBox               scheme_type_box;
    SchemeInformationBox        info;           // optional
}
```

The Scheme Type Box is currently defined as follows:
Scheme Type Box
Box Types: 'schm'
Container: Protection Scheme Information Box ('sinf'), Restricted Scheme
Information Box ('rinf'), or SRTP Process box ('srpp')
Mandatory: No
Quantity: Zero or one in 'sinf', depending on the protection structure; Exactly one in 'rinf' and 'srpp'
The Scheme Type Box ('schm') identifies the protection or restriction scheme.

```
aligned(8) class SchemeTypeBox extends FullBox('schm', 0, flags) {
    unsigned int(32)    scheme_type;     // 4CC identifying the scheme
    unsigned int(32)    scheme_version;  // scheme version
    if (flags & 0x000001) {
        unsigned int(8)     scheme_uri[ ];   // browser uri
    }
}
``` scheme_type is the code defining the protection or restriction scheme.
scheme_version is the version of the scheme (used to create the content)
scheme_URI allows for the option of directing the user to a web-page if they do not have the scheme installed on their system. It is an absolute URI formed as a null-terminated string in UTF-8 characters.
The Scheme Information Box is currently defined as follows:
Scheme Information Box
Box Types: 'schi'
Container: Protection Scheme Information Box ('sinf'), Restricted Scheme Information Box ('rinf'), or SRTP Process box ('srpp')
Mandatory: No
Quantity: Zero or one
The Scheme Information Box is a container Box that is only interpreted by the scheme being used. Any information the encryption or restriction system needs is stored here. The content of this box is a series of boxes whose type and format are defined by the scheme declared in the Scheme Type Box.

```
aligned(8) class SchemeInformationBox extends Box('schi') {
   Box scheme_specific data[ ];
}
```

Various problems exist with respect to the restricted scheme in the ISOBMFF. For example, in the existing design of the restricted scheme, there can be only one Restricted Scheme Information Box in its container (the Restricted Sample Entry container or Sample Entry container). Further, there can be only one Scheme Type Box in the Restricted Scheme Information Box, and there can be only zero or one Scheme Information Box in the Restricted Scheme Information Box.

Such restrictions do not allow multiple types of restricted schemes to be simultaneously applied to the same media content associated with one sample entry. A sample entry can be associated with one or more samples of a video file. However, many real-world media applications exist that utilize video content to which multiple restricted schemes is applied. Using frame-packed stereoscopic virtual reality video as one illustrative example, the restrictions on the restricted scheme prevent the possibility of applying both the restricted scheme for stereoscopic video arrangements (denoted as 'stvi' and defined in clause 8.15.4 of the ISOBMFF) and the restricted scheme for virtual reality video (denoted as 'vrvd' herein and defined in the MPEG input document m37914) to the same video content associated with one sample entry. Many other examples exist where multiple restricted schemes can be applied to the same media content associated with one sample entry.

Systems and techniques are described herein to address the above-noted problems with the restricted scheme. Some of the aspects described herein can be applied independently and some of them may be applied in combination. In some cases, a media format file can be generated (according to a media file format, such as ISOBMFF or other suitable format) that includes multiple restricted schemes that are applicable to certain video content. For example, the multiple restricted schemes can be simultaneously applied to the same media content associated with one sample entry. The improved design applies to any type of video codec. A player device can receive a media file with multiple restricted schemes indicated therein, and can parse the file to obtain the necessary information for applying the multiple restricted schemes to the video content. For example, using the information from the file, the player device can apply the multiple restricted schemes to media content associated with one sample entry in the file.

In some examples, multiple scheme type boxes can be included in a restricted scheme information box contained in a sample entry of a media format file. As noted above, a scheme type box defines the exact nature of a particular restriction. For instance, a scheme type box identifies a particular scheme type that is applicable to the video content (e.g., the scheme type that the track conforms to) associated with a sample entry. The multiple scheme type boxes provide the ability to identify a plurality of restricted scheme types required for processing the media content associated with the sample entry. In some cases, a scheme type box can also be referred to as a compatible scheme type box. In some examples, multiple scheme information boxes can also be included in the restricted scheme information box in addition to the multiple scheme type boxes. The data needed for a particular scheme type is stored in a corresponding scheme information box. For example, one scheme information box can be included in the restricted scheme information box for each scheme type box. A restricted scheme information box (restrictedSchemeInfoBox) is based on Box( ) instead of FullBox( ), there is no version field, hence a new version of the box cannot be defined. However, this method is backward compatible, as adding more optional boxes to the end in a box is allowed by design.

An illustrative example of a detailed embodiment of a media format file specifying multiple restricted schemes (using multiple scheme type boxes and scheme information boxes) that are applicable to media content associated with a sample entry is provided below. In the following example, additional text added to the implementations described in the restricted scheme design of the ISO/IEC standards (e.g., ISO/IEC 14496-n, ISO/IEC 15444-n, or the like) is shown between <*> brackets (e.g., as <"additional text">).

In the illustrative example, to implement a media format file specifying multiple restricted schemes applicable to media content associated with a sample entry, the definitions of the Restricted Scheme Information Box, Scheme Type Box, and Scheme Information Box are changed as shown below:

Restricted Scheme Information Box
Box Types: 'rinf'
Container: Restricted Sample Entry or Sample Entry
Mandatory: Yes
Quantity: Exactly one
The Restricted Scheme Information Box contains all the information required both to understand the restriction scheme applied and its parameters. It also documents the original (un-transformed) sample entry type of the media. The Restricted Scheme Information Box is a container Box. It is mandatory in a sample entry that uses a code indicating a restricted stream, i.e., 'resv'.
When used in a restricted sample entry, this box must contain the original format box to document the original sample entry type and a Scheme type box. A Scheme Information box may be required depending on the restriction scheme.

```
aligned(8) class RestrictedSchemeInfoBox(fmt) extends Box('rinf') {
   OriginalFormatBox(fmt)       original_format;
   SchemeTypeBox<#1>            scheme_type_box<#1>;
   SchemeInformationBox<#1>     info<#1>;           // optional
   <...
   SchemeTypeBox#i              scheme_type_box#i;  // optional
   SchemeInformationBox#i       info#i;             // optional
   ...
   SchemeTypeBox#N              scheme_type_box#N;  // optional
   SchemeInformationBox#N       info#N;             //optional>
}
```

Scheme Type Box
Box Types: 'schm'
Container: Protection Scheme Information Box ('sinf'), Restricted Scheme Information Box ('rinf'), or SRTP Process box ('srpp')
Mandatory: No
Quantity: Zero or one in 'sinf', depending on the protection structure; Exactly one in 'srpp'; <One or more in 'rinf'>
The Scheme Type Box ('schm') identifies the protection or restriction scheme type.

```
aligned(8) class SchemeTypeBox extends FullBox('schm', 0, flags) {
   unsigned int(32)   scheme_type;     // 4CC identifying the scheme
   unsigned int(32)   scheme_version;  // scheme version
```

```
if (flags & 0x000001) {
    unsigned int(8)     scheme uri[ ];     // browser uri
  }
}
``` scheme_type is the code defining the protection or restriction scheme.

scheme_version is the version of the scheme (used to create the content)

scheme_URI allows for the option of directing the user to a web-page if they do not have the scheme installed on their system. It is an absolute URI formed as a null-terminated string in UTF-8 characters.

Scheme Information Box

Box Types: 'schi'

Container: Protection Scheme Information Box ('sinf'), Restricted Scheme Information Box ('rinf'), or SRTP Process box ('srpp')

Mandatory: No

Quantity: Zero or one in 'sinf' and 'srpp'; <Zero or more in 'rinf'>

The Scheme Information Box is a container Box that is only interpreted by the scheme being used. Any information the encryption or restriction system needs is stored here. The content of this box is a series of boxes whose type and format are defined by the scheme declared in the Scheme Type Box.

```
aligned(8) class SchemeInformationBox extends Box('schi') {
  Box scheme_specific_data[ ];
}
```

As shown in the illustrative example above, the Restricted Scheme Information Box includes multiple scheme type boxes (SchemeTypeBox#1, SchemeTypeBox#i, through SchemeTypeBox#N), which indicate multiple scheme types that are needed for processing the media content associated with the particular sample entry container that contains the Restricted Scheme Information Box. In some cases, each of the scheme type boxes can also be denoted as CompatibleSchemeTypeBox. Further, the Restricted Scheme Information Box includes multiple scheme information boxes (SchemeInformationBox#1,SchemeInformationBox#i, through SchemeInformationBox#N), which include the data needed to perform the corresponding scheme type. For example, the SchemeInformationBox#1 can include one or more boxes that include the data needed to implement the scheme type identified by the SchemeTypeBox#1.

In some examples, a media format file generated according to the techniques described herein can include multiple restricted scheme information boxes in a sample entry container in order to indicate multiple restricted schemes that are applicable to media content associated with that sample entry. An illustrative example of a detailed embodiment of such a technique is provided below. In the following example, additional text added to the implementations described in the restricted scheme design of the ISO/IEC standards (e.g., ISO/IEC 14496-n, ISO/IEC 15444-n, or the like) is shown between <*> brackets (e.g., as <"additional text">).

The definitions of the Restricted Scheme Information Box is changed as shown below:

Restricted Scheme Information Box

Box Types: 'rinf'

Container: Restricted Sample Entry or Sample Entry

Mandatory: Yes

Quantity: <One or more>

The Restricted Scheme Information Box contains all the information required both to understand the restriction scheme applied and its parameters. It also documents the original (un-transformed) sample entry type of the media. The Restricted Scheme Information Box is a container Box. It is mandatory in a sample entry that uses a code indicating a restricted stream, i.e., 'resv'.

When used in a restricted sample entry, this box must contain the original format box to document the original sample entry type and a Scheme type box. A Scheme Information box may be required depending on the restriction scheme.

```
aligned(8) class RestrictedSchemeInfoBox(fmt) extends Box('rinf') {
  OriginalFormatBox(fmt)      original_format;
  SchemeTypeBox               scheme_type_box;
  SchemeInformationBox        info;              // optional
}
```

As shown in the above illustrative example, generating a media format file with multiple restricted scheme information boxes in a sample entry container of the media format file allows the file to indicate multiple restricted schemes that are applicable to media content associated with the sample entry.

Figure 4:
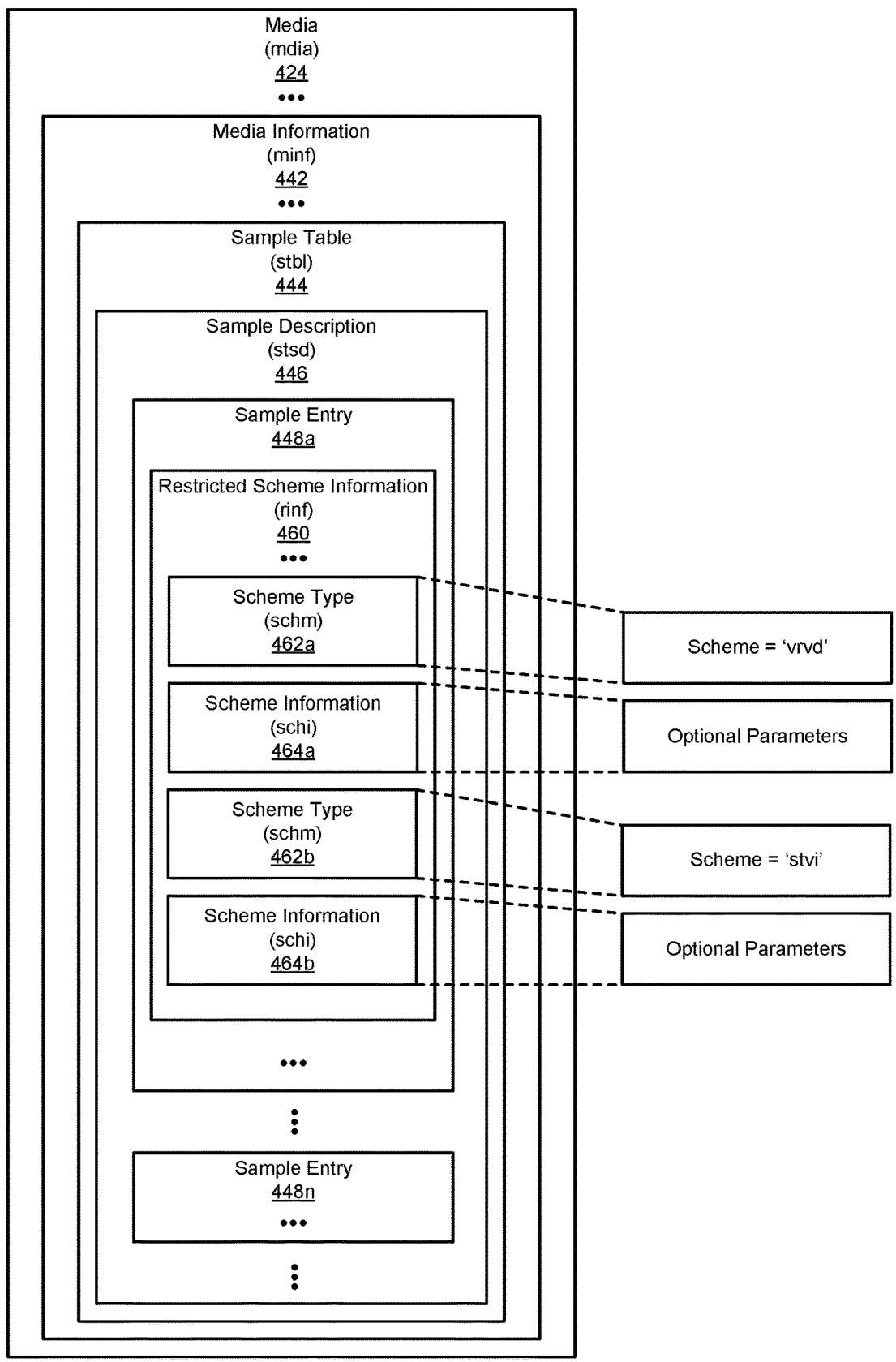
FIG. 4 is a diagram illustrating an example of a media box that can be included in an ISO base media file, in accordance with some examples.

FIG. 4 illustrates an example of a media box 424 that can be included in an ISO base media file that specifies multiple restricted schemes (using multiple scheme type boxes 462a, 462b and multiple scheme information boxes 464a, 464b) that are applicable to media content associated with a sample entry. As discussed above, a media box can be included in a track box, and can contain objects and information that describe media data in the track. In the illustrated example, the media box 424 includes a media information box 442. The media box 424 can also include other boxes, which are not illustrated here.

The media information box 442 can contain objects that describe characteristic information about the media in the track. For example, the media information box 442 can include a data information box, which describes the location of media information in the track. As another example, the media information box 442 can include a video media header, when the track includes video data. The video media header can contain general presentation information that is independent of the coding of the video media. The media information box 442 can also include a sound media header when the track includes audio data.

The media information box 442 can also include a sample table box 444. The sample table box 444, identified by the box type "stbl," can provide locations (e.g., locations with a file) for the media samples in the track, as well as time information for the samples. Using the information provided by the sample table box 444, a player device can locate samples in correct time order, determine the type of a sample, and/or determine the size, container, and offset of a sample within a container, among other things.

The sample table box 444 can include a sample description box 446, identified by the box type "stsd." The sample description box 446 can provide detailed information about, for example, the coding type used for a sample, and any initialization information needed for that coding type. The information stored in the sample description box can be specific to a type of the track that includes the samples. For example, one format may be used for the sample description when the track is a video track and a different format may be used when the track is a hint track. As a further example, the format for the sample description may also vary depending on the format of the hint track.

The sample description box 446 can include one or more sample entries 448a through 448n. The sample entry type is an abstract class, and thus typically the sample description box includes a specific sample entry box, such as a visual sample entry for video data or an audio sample entry for audio samples, among other examples. A sample entry box can store the parameters for a particular sample. For example, for a video sample, the sample entry box can include a width, height, horizontal resolution, vertical resolution, frame count, and/or depth for the video sample, among other things. As another example, for an audio sample, the sample entry can include a channel count, a channel layout, and/or a sampling rate, among other things.

In the illustrated example, the first sample entry 448a includes a restricted scheme information box 460. In such an example, the first sample entry 448a can have a code (e.g., 'resv') indicating a restricted stream. As described herein, a restricted scheme information box, identified by the box type "rinf," can contain the information (e.g., in one or more other boxes) required both to understand a restricted scheme applied to a sample and the parameters of the scheme. As noted above, the author of a file may require certain actions from a player device to process certain media content. In such cases, the file can include a restricted scheme information box, which a player device can locate and use to determine the requirements for rendering the media content associated with the sample entry. Players that may not be able to render the content can also use the restricted scheme information box to determine that they cannot render the content, and thus should not attempt to process the content. The restricted scheme information box typically includes an original sample entry type, that is, the type of the sample entry prior to any transformation described by the restricted scheme information box.

In various implementations, as noted above, different types of restricted schemes can be defined for different kinds of content. The type of a restricted scheme can be specified in a scheme type box, identified by the box type "schm." Illustrative examples of restricted scheme types include a restricted scheme type for stereoscopic video arrangements (denoted as 'stvi'), a restricted scheme type for virtual reality video (denoted as 'vrvd'), a restricted scheme type for projected omnidirectional video (denoted as 'podv'), a restricted scheme type for equirectangular projected video (denoted as 'erpv'), a restricted scheme type for packed equirectangular or cubemap projected video (denoted as 'ercm'), a restricted scheme type for fisheye omnidirectional video (denoted as 'fodv'), among others.

In the illustrative example shown in FIG. 4, the first sample entry 448a includes frame-packed stereoscopic virtual reality video content. Two types of restricted schemes that are applicable to frame-packed stereoscopic virtual reality video content include the restricted scheme type for stereoscopic video arrangements ('stvi') and the restricted scheme type for virtual reality video ('vrvd'). The restricted scheme information box 460 is added to the first sample entry 448a that includes the frame-packed stereoscopic virtual reality video content. The scheme type box 462a indicates the restricted scheme type for virtual reality content, denoted as 'vrvd,' and the scheme type box 462b indicates the restricted scheme type for stereoscopic video content, denoted as 'stvi.'

The restricted scheme information box 460 in the illustrated example also includes two scheme information boxes 464a and 464b, both identified by the box type "schi." The scheme information boxes 464a, 464b can store information for the specific schemes for which they are related. For example, the scheme information box 464a is applicable to the restricted scheme type box 462a for the virtual reality content (the 'vrvd' scheme type), and includes parameters for the virtual reality content. These parameters can include, for example, whether the virtual reality video is 2-D or 3-D, whether the virtual reality video is pre-stitched or post-stitched, and/or a mapping for the virtual reality video. In various implementations, a scheme information box can be defined for virtual reality content, specifically for containing parameters for the virtual reality content.

The scheme information box 464b is applicable to the restricted scheme type box 462b for the frame-packed stereoscopic content (the 'stvi' scheme type), and includes parameters needed for the restricted scheme type of the frame-packed stereoscopic content. For example, when stereo-coded video frames are decoded, the decoded frames can contain a representation of two spatially packed constituent frames that form a stereo pair (frame packing) or can include only one view of a stereo pair (left and right views in different tracks). Restrictions due to stereo-coded video can be contained in the scheme information box 464b. For instance, the scheme information box 464b is a container box, and a box contained in the scheme information box 464b can include a box denoted as 'StereoVideoBox.' In one illustrative example, for stereoscopic video frames, the parameters in the scheme information box 464b (e.g., in the StereoVideoBox contained in the scheme information box 464b) can include information indicating that decoded frames either contain a representation of two spatially packed constituent frames that form a stereo pair or contain one of two views of a stereo pair. For instance, the two spatially packed constituent pictures can include two fisheye images of the same scene at a same time instance, but from different views. The two pictures can be packed into a video frame (e.g., in a side-by-side packing arrangement). In another example, for omnidirectional images, the parameters in the scheme information box 464b can include information indicating the reconstructed image contains a representation of two spatially packed constituent pictures.

An illustrative example of the Stereo Video Box is now described. As noted above, the Stereo Video Box can be contained in the scheme information box 464b and includes the data needed for the 'stvi' restricted scheme type. The Stereo Video Box can be defined as follows:

Box Type: 'stvi'
Container: SchemeInformationBox
Mandatory: Yes (when the SchemeType is 'stvi')
Quantity: One An example of the syntax and semantics for the Stereo Video Box are as follows:

```
aligned(8) class StereoVideoBox extends extends FullBox('stvi', version = 0, 0)
{
    template unsigned    int(30) reserved = 0;
    unsigned int (2)     single_view_allowed;
    unsigned int(32)     stereo_scheme;
    unsigned int(32)     length;
    unsigned int(8)[length] stereo_indication_type;
    Box[ ] any_box; // optional
}
``` single_view_allowed is an integer. A zero value indicates that the content may only be displayed on stereoscopic displays. When (single_view_allowed & 1) is equal to 1, it is allowed to display the right view on a monoscopic single-view display. When (single_view_allowed & 2) is equal to 2, it is allowed to display the left view on a monoscopic single-view display.

stereo_scheme is an integer that indicates the stereo arrangement scheme used and the stereo indication type according to the used scheme. The following values for stereo_scheme are specified:
  1: the frame packing scheme as specified by the Frame packing arrangement Supplemental Enhancement Information message of ISO/IEC 14496-10 [ISO/IEC 14496-10]
  2: the arrangement type scheme as specified in Annex L of ISO/IEC 13818-2 [ISO/IEC 13818-2:2000/Amd.4]
  3: the stereo scheme as specified in ISO/IEC 23000-11 for both frame/service compatible and 2D/3D mixed services.
  Other values of stereo_scheme are reserved.

length indicates the number of bytes for the stereo_indication_type field.

stereo_indication_type indicates the stereo arrangement type according to the used stereo indication scheme. The syntax and semantics of stereo_indication_type depend on the value of stereo_scheme. The syntax and semantics for stereo_indication_type for the following values of stereo_scheme are specified as follows:
  stereo_scheme equal to 1: The value of length shall be 4 and stereo_indication_type shall be unsigned int (32) which contains the frame_packing_arrangement_type value from Table D-8 of ISO/IEC 14496-10 [ISO/IEC 14496-10] (Definition of 'frame_packing_arrangement_type').
  stereo_scheme equal to 2: The value of length shall be 4 and stereo_indication_type shall be unsigned int (32) which contains the type value from Table L-1 of ISO/IEC 13818-2 [ISO/IEC 13818-2:2000/Amd.4] (Definition of 'arrangement_type').
  stereo_scheme equal to 3: The value of length shall be 2 and stereo_indication_type shall contain two syntax elements of unsigned int (8). The first syntax element shall contain the stereoscopic composition type from Table 4 of ISO/IEC 23000-11:2009. The least significant bit of the second syntax element shall contain the value of is_left_first as specified in 8.4.3 of ISO/IEC 23000-11:2009, while the other bits are reserved and shall be set to 0.

The following applies when the StereoVideoBox is used:
In the TrackHeaderBox
  width and height specify the visual presentation size of a single view after unpacking.
In the SampleDescriptionBox
  frame_count shall be 1, because the decoder physically outputs a single frame. In other words, the constituent frames included within a frame-packed picture are not documented by frame_count.
  width and height document the pixel counts of a frame-packed picture (and not the pixel counts of a single view within a frame-packed picture).
  the PixelAspectRatioBox documents the pixel aspect ratio of each view when the view is displayed on a monoscopic single-view display. For example, in many spatial frame packing arrangements, the Pixel Aspect Ratio box therefore indicates 2:1 or 1:2 pixel aspect ratio, as the spatial resolution of one view of frame-packed video is typically halved along one coordinate axis compared to that of the single-view video of the same format.

By generating the media information box 442 with the restricted scheme information box 460 to include both the scheme type box 462a and the scheme type box 462b, as well as both the scheme information box 464a and the scheme information box 464b, both types of restricted schemes (the 'vrvd' and 'stvi' scheme types) can be simultaneously applied to the frame-packed stereoscopic virtual reality video content associated with the first sample entry 448a.

Many other examples exist where multiple restricted schemes can be applied to the same media content associated with one sample entry. For example, virtual reality video (or 360-degree video) content can include spherical video content projected to an equirectangular representation. As another example, virtual reality video (or 360-degree video) content can include spherical video content projected to a cubemap geometry, a truncated square pyramid geometry, or other projection. Multiple restricted schemes can be applied to such content. Examples of restricted schemes that can be included in a media file and that are applicable to media content associated with a sample entry in the media file are described below.

Another example of a restricted scheme type is for projected omnidirectional video (with a scheme type denoted as 'podv'). For example, the use of the projected omnidirectional video scheme for the restricted video sample entry type 'resv' indicates that the decoded pictures are packed pictures containing either monoscopic or stereoscopic content. The use of the projected omnidirectional video scheme is indicated by scheme_type equal to 'podv' (projected omnidirectional video) within a scheme type box (SchemeTypeBox) in a restricted scheme information box (RestrictedSchemeInfoBox). The format of the projected monoscopic pictures is indicated with a ProjectedOmniVideoBox contained within the scheme information box (SchemeInformationBox) in the restricted scheme information box. In some cases, one and only one ProjectedOmniVideoBox shall be present in the SchemeInformationBox when the scheme type is 'podv.' In some cases, the 'podv' scheme type is defined as an open-ended scheme type for projected omnidirectional video.

Another restricted scheme type is provided for equirectangular projected video (with a scheme type denoted as 'erpv'). In some cases, the 'erpv' scheme type is defined as a closed scheme type for projected omnidirectional video. When scheme_type is equal to 'erpv' in a scheme type box (also referred to as a compatible scheme type box) in a restricted scheme information box (RestrictedSchemeInfoBox), the corresponding track conforms to the constraints of scheme_type equal to 'podv' (as defined in the ISO/IEC 14496-15 standards documents) with various additional constraints. For example, a projection format box (ProjectionFormatBox) within a projected omni video box (ProjectedOmniVideoBox) shall indicate the equirectangular projection. Further, when a region wise packing box (RegionWisePackingBox) is present, the following constraints all apply:
  The value of NumRegions shall be equal to HorDiv1*VerDiv1.
  For each value of i in the range of 0 to NumRegions−1, inclusive, the following applies:
  The value of PackingType[i] shall be equal to 0.
  The value of TransformType[i] shall be equal to 0.

The value of PackedRegWidth[i] shall be equal to ProjRegWidth[i].

The value of PackedRegHeight[i] shall be equal to ProjRegHeight[i].

Other constraints associated with the equirectangular projected video restricted scheme type 'erpv' include that the version of ProjectionFormatBox, StereoVideoBox (when present), RegionWisePackingBox (when present), RotationBox (when present), and CoverageInformationBox (when present) shall be equal to 0. Further, the scheme information box (SchemeInformationBox) shall not directly or indirectly contain any boxes other than ProjectedOmniVideoBox, ProjectionFormatBox, StereoVideoBox, RegionWisePackingBox, RotationBox, and CoverageInformationBox.

Figure 5:
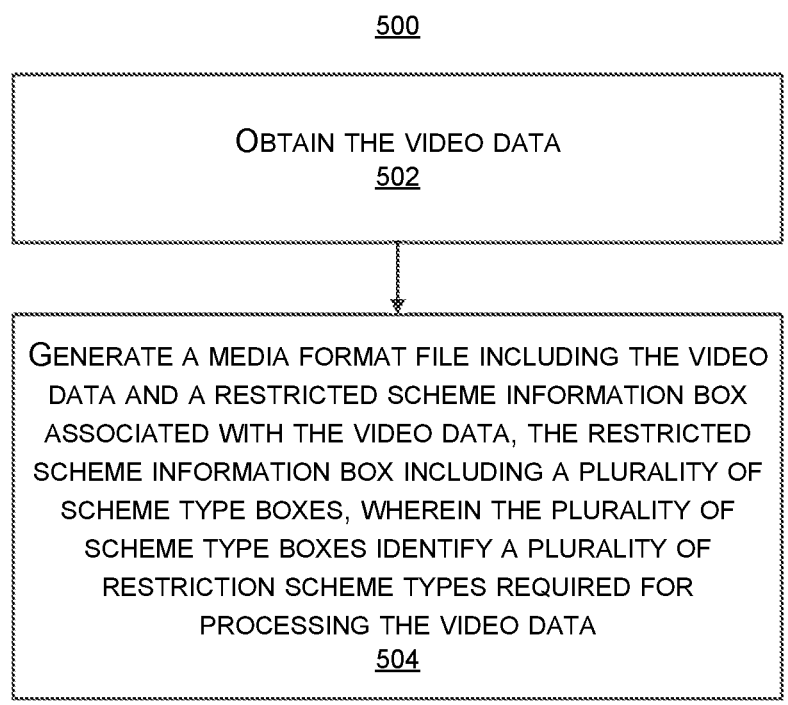
FIG. 5 is a flowchart illustrating an example of a process for processing video data, in accordance with some examples.

FIG. 5 is a flowchart illustrating an example of a process 500 for processing video data using the techniques described herein. At block 502, the process 500 includes obtaining the video data. In one illustrative example, the video data can include a portion (e.g., one or more samples) of an encoded video bitstream that is to be associated with a sample entry of a media format file. In some examples, the encoded video bitstream can be encrypted. In another illustrative example, the video data can include a portion of video (e.g., captured by one or more cameras) that is to be associated with a sample entry of a media format file. In such an example, the video data can be encoded and, in some cases, encrypted by the process 500 before the media format file is generated.

At block 504, the process 500 includes generating a media format file including the video data and a restricted scheme information box associated with the video data. In one illustrative example, the media format file is generated using an ISO base media file format (ISOBMFF) or using a media file format derived from the ISO base media file format. The restricted scheme information box includes a plurality of scheme type boxes. The plurality of scheme type boxes identify a plurality of restricted scheme types required for processing the video data. For example, each scheme type box of the plurality of scheme type boxes can identify a different restricted scheme type required for processing the video data. In some cases, the video data is associated with one sample entry of the media format file. In such cases, the media format file can specify multiple restricted schemes (using the plurality of scheme type boxes and, in some cases, multiple scheme information boxes) that are applicable to video data associated with the one sample entry of the media format file. In some examples, a scheme type box of the plurality of scheme type boxes identifies a version of a restricted scheme type identified by the scheme type box. For example, the value of scheme_version used above can have a particular value (e.g., 0, 1, 2, and so on) that indicates a version of a particular restricted scheme type. The different versions of a particular restricted scheme type can include variants of the restricted scheme indicated by the scheme type. In some examples, a scheme type box of the plurality of scheme type boxes includes an identifier identifying a source for data needed to implement a restricted scheme type identified by the scheme type box. For example, the identifier can include a Uniform Resource Locator (URL) or other suitable source identifier that can provide access to a source for obtaining data.

The restricted scheme types identified by the plurality of scheme type boxes can include any suitable restricted scheme types. Illustrative examples of restricted scheme types include a restricted scheme type for stereoscopic video arrangements (denoted as 'stvi'), a restricted scheme type for virtual reality video (denoted as 'vrvd'), a restricted scheme type for projected omnidirectional video (denoted as 'podv'), a restricted scheme type for equirectangular projected video (denoted as 'erpv'), a restricted scheme type for packed equirectangular or cubemap projected video (denoted as 'ercm'), a restricted scheme type for fisheye omnidirectional video (denoted as 'fodv'), among others.

In some examples, the restricted scheme information box further includes a plurality of scheme information boxes. A scheme information box of the plurality of scheme information boxes includes data needed for a restricted scheme type identified by a scheme type box of the plurality of scheme type boxes. Using an example from above, the scheme information box can include a Stereo Video Box that includes the data needed for the 'stvi' restricted scheme type.

Once generated, the media format file can be used in any suitable manner. For example, the process 500 can include transmitting the media format file. For example, the media format file can be transmitted to a file processing device (e.g., a media player, a file parser, a decoding device, a storage device, an intermediary device such as a server, and/or other suitable device). In another example, the process 500 can include storing the media format file.

In some examples, the process 500 may be performed by a computing device or an apparatus, such as a media format file generation device, the encoding device 104 (which can be configured to generate media format files), or any other computing device. In some cases, the computing device or apparatus may include a processor, microprocessor, microcomputer, or other component of a device that is configured to carry out the steps of process 500. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or other network data.

FIG. 6 is a flowchart illustrating an example of a process 600 for processing one or more media format files using the techniques described herein. At block 602, the process 600 includes obtaining a media format file including video data and a restricted scheme information box associated with the video data. In one illustrative example, the media format file is generated using an ISO base media file format (ISOBMFF) or using a media file format derived from the ISO base media file format. The restricted scheme information box includes a plurality of scheme type boxes. The plurality of scheme type boxes identify a plurality of restricted scheme types required for processing the video data. For example, each scheme type box of the plurality of scheme type boxes can identify a different restricted scheme type required for processing the video data. In some cases, the video data is associated with one sample entry of the media format file. In such cases, the media format file can specify multiple restricted schemes (using the plurality of scheme type boxes and, in some cases, multiple scheme information boxes) that are applicable to video data associated with the one sample entry of the media format file. In some examples, a scheme type box of the plurality of scheme type boxes identifies a version of a restricted scheme type identified by the scheme type box. In some examples, a scheme type box of the plurality of scheme type boxes includes an identifier identifying a source for data needed to implement a restricted scheme type identified by the scheme type box. For example, the identifier can include a Uniform Resource Locator (URL) or other suitable source identifier that can provide access to a source for obtaining data.

The restricted scheme types identified by the plurality of scheme type boxes can include any suitable restricted scheme types. Illustrative examples of restricted scheme types include a restricted scheme type for stereoscopic video arrangements (denoted as 'stvi'), a restricted scheme type for virtual reality video (denoted as 'vrvd'), a restricted scheme type for projected omnidirectional video (denoted as 'podv'), a restricted scheme type for equirectangular projected video (denoted as 'erpv'), a restricted scheme type for packed equirectangular or cubemap projected video (denoted as 'ercm'), a restricted scheme type for fisheye omnidirectional video (denoted as 'fodv'), among others.

In some examples, the restricted scheme information box further includes a plurality of scheme information boxes. A scheme information box of the plurality of scheme information boxes includes data needed for a restricted scheme type identified by a scheme type box of the plurality of scheme type boxes. Using an example from above, the scheme information box can include a Stereo Video Box that includes the data needed for the 'stvi' restricted scheme type.

At block 604, the process 600 includes parsing the media format file. For example, each of the boxes included in the media format file can be parsed by unwrapping the boxes and obtaining the content within the boxes. At block 606, the process 600 includes processing the video data according to the plurality of restricted scheme types identified by the plurality of scheme type boxes.

The video data and content parsed from the media format file can be processed as need. For example, the process 600 can decode the video data (e.g., using a decoder). The process 600 can further include rendering and displaying the decoded video data using the information related to the restriction schemes included in the media format file.

In some examples, the process 600 may be performed by a computing device or an apparatus, such as a media format file processing device, the decoding device 112 (which can be configured to parse media format files, such as by performing inverse transformations of the media format files), or any other computing device. In some cases, the computing device or apparatus may include a processor, microprocessor, microcomputer, or other component of a device that is configured to carry out the steps of process 600. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or other network data.

Processes 500 and 600 are illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500 and 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The techniques and systems discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 7:
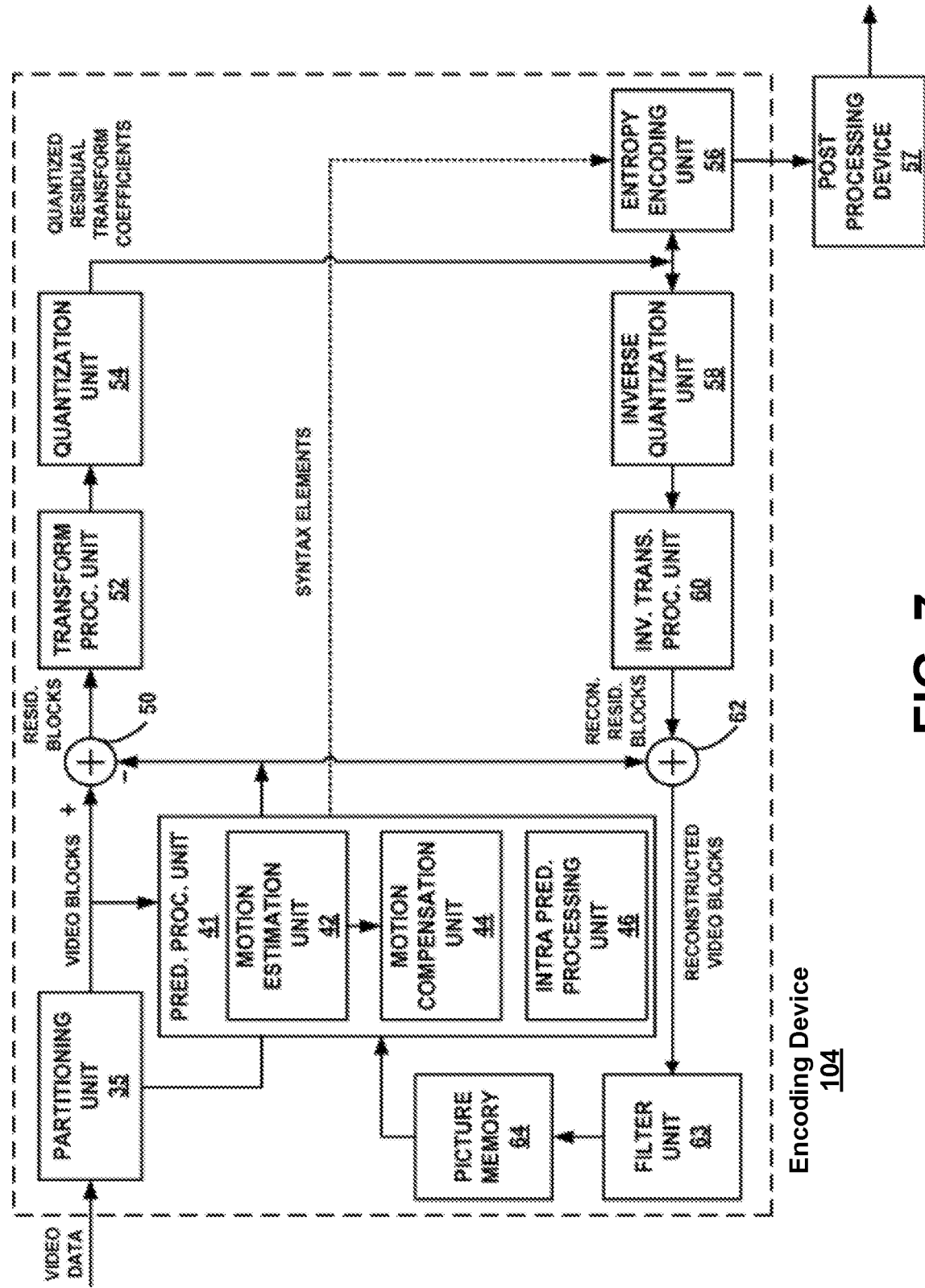
FIG. 7 is a block diagram illustrating an example video encoding device, in accordance with some examples.
Figure 8:
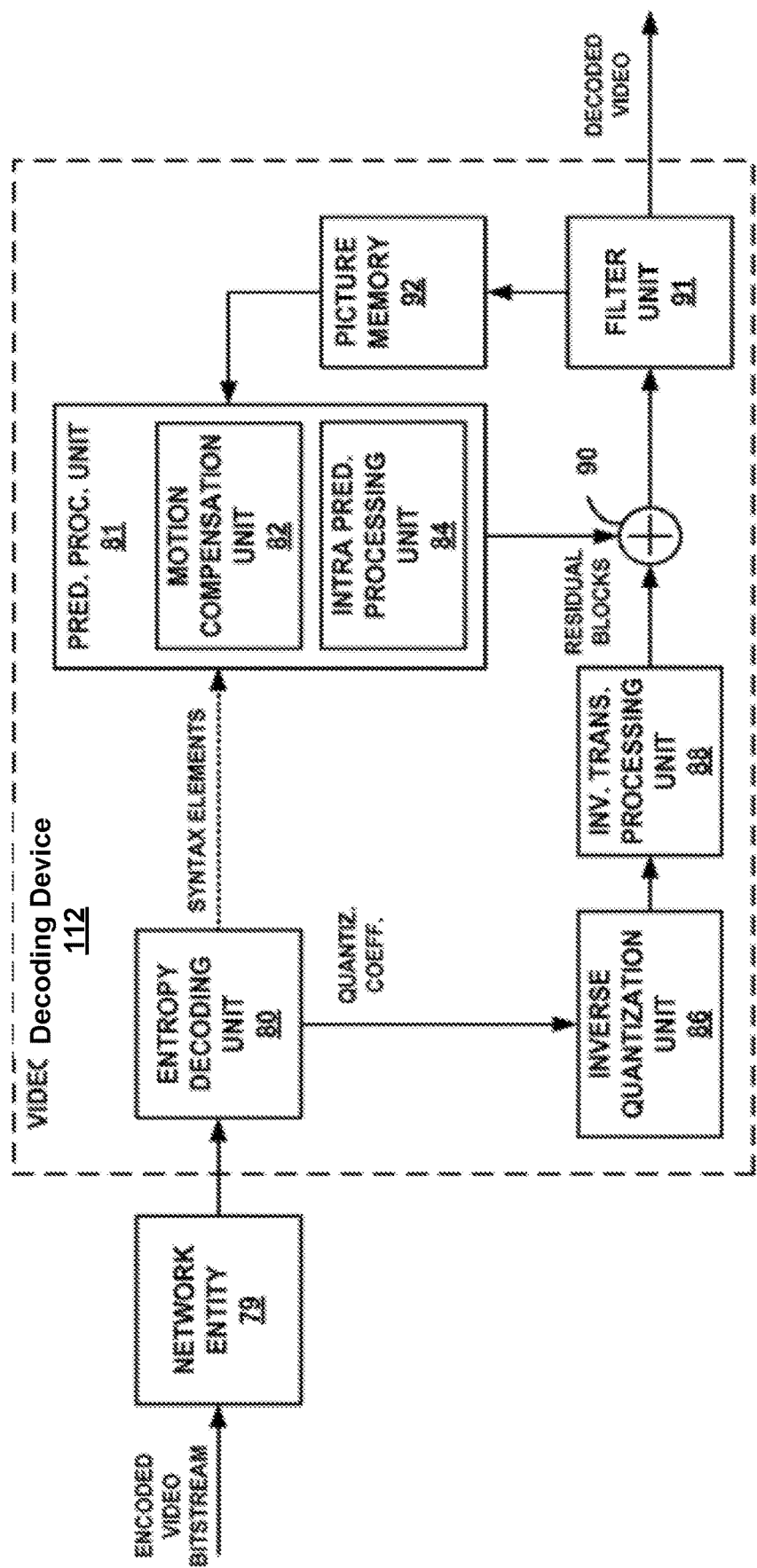
FIG. 8 is a block diagram illustrating an example video decoding device, in accordance with some examples.

Specific details of the encoding device 104 and the decoding device 112 are shown in FIG. 7 and FIG. 8, respectively. FIG. 7 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 7 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 7, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bitrate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 7 represents an example of a video encoder configured to derive LIC parameters, adaptively determine sizes of templates, and/or adaptively select weights. The encoding device 104 may, for example, derive LIC parameters, adaptively determine sizes of templates, and/or adaptively select weights sets as described above. For instance, the encoding device 104 may perform any of the techniques described herein, including the processes described above with respect to FIG. 5. In such cases, the encoding device 104 is configured to generate media format files. In some cases, some of the techniques of this disclosure may also be implemented by post processing device 57.

FIG. 8 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 7.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 8 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 8 represents an example of a video decoder configured to derive LIC parameters, adaptively determine sizes of templates, and/or adaptively select weights. The decoding device 112 may, for example, derive LIC parameters, adaptively determine sizes of templates, and/or adaptively select weights sets as described above. For instance, the decoding device 112 may perform any of the techniques described herein, including the process described above with respect to FIG. 6. In such cases, the decoding device 112 is configured to parse media format files.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing video data, the method comprising:
    obtaining the video data;
    generating a media format file including the video data;
    generating, for a sample entry of the media format file, a restricted scheme information box, the sample entry being associated with one or more samples of the video data; and
    generating, for the restricted scheme information box generated for the sample entry of the media format file, a plurality of scheme type boxes, the plurality of scheme type boxes identifying a plurality of restricted scheme types required for processing the one or more samples of the video data associated with the sample entry.

2. The method of claim 1, wherein each scheme type box of the plurality of scheme type boxes identifies a different restricted scheme type required for processing the video data.

3. The method of claim 1, wherein a scheme type box of the plurality of scheme type boxes identifies a version of a restricted scheme type identified by the scheme type box.

4. The method of claim 1, wherein a scheme type box of the plurality of scheme type boxes includes an identifier identifying a source for data needed to implement a restricted scheme type identified by the scheme type box.

5. The method of claim 1, wherein the restricted scheme information box further includes a plurality of scheme information boxes, and wherein a scheme information box of the plurality of scheme information boxes includes data needed for a restricted scheme type identified by a scheme type box of the plurality of scheme type boxes.

6. The method of claim 1, wherein the media format file is generated using an ISO base media file format (ISOBMFF) or using a media file format derived from the ISO base media file format.

7. The method of claim 1, further comprising transmitting the media format file.

8. The method of claim 1, further comprising storing the media format file.

9. An apparatus for processing video data, comprising:
    a memory configured to store the video data; and
    a processor configured to:
        obtain the video data;
        generate a media format file including the video data;
        generate, for a sample entry of the media format file, a restricted scheme information box, the sample entry being associated with one or more samples of the video data; and
        generate, for the restricted scheme information box generated for the sample entry of the media format file, a plurality of scheme type boxes, the plurality of scheme type boxes identifying a plurality of restricted scheme types required for processing the one or more samples of the video data associated with the sample entry.

10. The apparatus of claim 9, wherein each scheme type box of the plurality of scheme type boxes identifies a different restricted scheme type required for processing the video data.

11. The apparatus of claim 9, wherein a scheme type box of the plurality of scheme type boxes identifies a version of a restricted scheme identified by the scheme type box.

12. The apparatus of claim 9, wherein a scheme type box of the plurality of scheme type boxes includes an identifier identifying a source for data needed to implement a restricted scheme type identified by the scheme type box.

13. The apparatus of claim 9, wherein the restricted scheme information box further includes a plurality of scheme information boxes, and wherein a scheme information box of the plurality of scheme information boxes includes data needed for a restricted scheme type identified by a scheme type box of the plurality of scheme type boxes.

14. The apparatus of claim 9, wherein the media format file is generated using an ISO base media file format (ISOBMFF) or using a media file format derived from the ISO base media file format.

15. The apparatus of claim 9, wherein the processor is configured to transmit the media format file.

16. The apparatus of claim 9, wherein the processor is configured to store the media format file.

17. The apparatus of claim 9, wherein the apparatus comprises a mobile device with a camera for capturing pictures.

18. A non-transitory computer-readable medium having stored thereon instructions that, when executed by one or more processors, cause the one or more processors to:
    obtain video data;
    generate a media format file including the video data;
    generate, for a sample entry of the media format file, a restricted scheme information box, the sample entry being associated with one or more samples of the video data; and
    generate, for the restricted scheme information box generated for the sample entry of the media format file, a plurality of scheme type boxes, the plurality of scheme type boxes identifying a plurality of restricted scheme types required for processing the one or more samples of the video data associated with the sample entry.

19. The non-transitory computer-readable medium of claim 18, wherein each scheme type box of the plurality of scheme type boxes identifies a different restricted scheme type required for processing the video data.

20. The non-transitory computer-readable medium of claim 18, wherein a scheme type box of the plurality of scheme type boxes identifies a version of a restricted scheme type identified by the scheme type box.

21. The non-transitory computer-readable medium of claim 18, wherein a scheme type box of the plurality of scheme type boxes includes an identifier identifying a source for data needed to implement a restricted scheme type identified by the scheme type box.

22. The non-transitory computer-readable medium of claim 18, wherein the restricted scheme information box further includes a plurality of scheme information boxes, and wherein a scheme information box of the plurality of scheme information boxes includes data needed for a restricted scheme type identified by a scheme type box of the plurality of scheme type boxes.

23. The non-transitory computer-readable medium of claim 18, wherein the media format file is generated using an ISO base media file format (ISOBMFF) or using a media file format derived from the ISO base media file format.

24. A method of processing one or more media format files, comprising:
obtaining a media format file including video data;
obtaining, for a sample entry of the media format file, a restricted scheme information box, the sample entry being associated with one or more samples of the video data;
obtaining, from the restricted scheme information box obtained for the sample entry of the media format file, a plurality of scheme type boxes, the plurality of scheme type boxes identifying a plurality of restricted scheme types required for processing the one or more samples of the video data associated with the sample entry; and
processing the one or more samples of the video data according to the plurality of restricted scheme types identified by the plurality of scheme type boxes.

25. The method of claim 24, wherein each scheme type box of the plurality of scheme type boxes identifies a different restricted scheme type required for processing the video data.

26. The method of claim 24, wherein a scheme type box of the plurality of scheme type boxes identifies a version of a restricted scheme type identified by the scheme type box.

27. The method of claim 24, wherein a scheme type box of the plurality of scheme type boxes includes an identifier identifying a source for data needed to implement a restricted scheme type identified by the scheme type box.

28. The method of claim 24, wherein the restricted scheme information box further includes a plurality of scheme information boxes, and wherein a scheme information box of the plurality of scheme information boxes includes data needed for a restricted scheme type identified by a scheme type box of the plurality of scheme type boxes.

29. The method of claim 24, wherein the media format file is generated using an ISO base media file format (ISOBMFF) or using a media file format derived from the ISO base media file format.

30. The method of claim 24, further comprising decoding the video data.

31. The method of claim 30, further comprising displaying the decoded video data.

32. An apparatus for processing one or more media format files, comprising:
a memory configured to store video data and the one or more media format files; and
a processor configured to:
obtain a media format file including the video data;
obtain, for a sample entry of the media format file, a restricted scheme information box, the sample entry being associated with one or more samples of the video data;
obtain, from the restricted scheme information box obtained for the sample entry of the media format file, a plurality of scheme type boxes, the plurality of scheme type boxes identifying a plurality of restricted scheme types required for processing the one or more samples of the video data associated with the sample entry; and
process the one or more samples of the video data according to the plurality of restricted scheme types identified by the plurality of scheme type boxes.

33. The apparatus of claim 32, wherein each scheme type box of the plurality of scheme type boxes identifies a different restricted scheme type required for processing the video data.

34. The apparatus of claim 32, wherein a scheme type box of the plurality of scheme type boxes identifies a version of a restricted scheme type identified by the scheme type box.

35. The apparatus of claim 32, wherein a scheme type box of the plurality of scheme type boxes includes an identifier identifying a source for data needed to implement a restricted scheme type identified by the scheme type box.

36. The apparatus of claim 32, wherein the restricted scheme information box further includes a plurality of scheme information boxes, and wherein a scheme information box of the plurality of scheme information boxes includes data needed for a restricted scheme type identified by a scheme type box of the plurality of scheme type boxes.

37. The apparatus of claim 32, wherein the media format file is generated using an ISO base media file format (ISOBMFF) or using a media file format derived from the ISO base media file format.

38. The apparatus of claim 32, further comprising:
a decoder for decoding the video data.

39. The apparatus of claim 38, further comprising:
a display for displaying the decoded video data.

40. The apparatus of claim 32, wherein the apparatus comprises a mobile device with a camera for capturing pictures.

41. A non-transitory computer-readable medium having stored thereon instructions that, when executed by one or more processors, cause the one or more processors to:
obtain a media format file including video data;
obtain, for a sample entry of the media format file, a restricted scheme information box, the sample entry being associated with one or more samples of the video data;
obtain, from the restricted scheme information box obtained for the sample entry of the media format file, a plurality of scheme type boxes, the plurality of scheme type boxes identifying a plurality of restricted scheme types required for processing the one or more samples of the video data associated with the sample entry; and
process the one or more samples of the video data according to the plurality of restricted scheme types identified by the plurality of scheme type boxes.

42. The non-transitory computer-readable medium of claim 41, wherein each scheme type box of the plurality of scheme type boxes identifies a different restricted scheme type required for processing the video data.

43. The non-transitory computer-readable medium of claim 41, wherein a scheme type box of the plurality of scheme type boxes identifies a version of a restricted scheme type identified by the scheme type box.

44. The non-transitory computer-readable medium of claim 41, wherein a scheme type box of the plurality of scheme type boxes includes an identifier identifying a source for data needed to implement a restricted scheme type identified by the scheme type box.

45. The non-transitory computer-readable medium of claim 41, wherein the restricted scheme information box further includes a plurality of scheme information boxes, and wherein a scheme information box of the plurality of scheme information boxes includes data needed for a restricted scheme type identified by a scheme type box of the plurality of scheme type boxes.

46. The non-transitory computer-readable medium of claim 41, wherein the media format file is generated using an ISO base media file format (ISOBMFF) or using a media file format derived from the ISO base media file format.

* * * * *